Sept. 8 1970     K. W. ABENDROTH     3,527,936
SWITCH POINT DETECTOR

Filed Feb. 27, 1968

INVENTOR
K. W. ABENDROTH

BY *Forest B. Hitchcock*

HIS ATTORNEY

INVENTOR
K. W. ABENDROTH
BY Forest B. Hitchcock
HIS ATTORNEY

Sept. 8 1970    K. W. ABENDROTH    3,527,936
SWITCH POINT DETECTOR

Filed Feb. 27, 1968    4 Sheets-Sheet 4

INVENTOR
K. W. ABENDROTH

BY *Forest B. Hitchcock*

HIS ATTORNEY

United States Patent Office 3,527,936
Patented Sept. 8, 1970

3,527,936
SWITCH POINT DETECTOR
Karl W. Abendroth, Rochester, N.Y., assignor to General Signal Corporation, Rochester, N.Y., a corporation of New York
Filed Feb. 27, 1968, Ser. No. 708,629
Int. Cl. B61l 5/10
U.S. Cl. 246—253          3 Claims

ABSTRACT OF THE DISCLOSURE

This switch point detector clamps to the outside of the main rail of a railway track switch and has a plunger passing under such main rail for attachment to the movable switch point. This attachment permits vertical and longitudinal movement of the switch point due to temperature changes or other forces and also compensates for the hinge action of the switch point without interfering with its accurate detection of transverse movement. Each switch point detector can detect a single position of a particular point. If both positions of a track switch are required to be detected, two point detectors are used, one for each movable point.

BACKGROUND OF THE INVENTION

This invention relates to a switch point detector for railroads, and more particularly pertains to a detector for each movable point of a track switch, which detector is clamped to the main rail for detecting the position of the movable point.

Track switches of railroads have two movable points, the heels of which are hinged adjacent a frog; and these two movable points are connected by switch rods at spaced distances from the points to insure that the points move together and maintain themselves in proper alignment.

When power switch machines are employed, there are usually two point detector rods attached respectively to the individual movable points. When both point detector rods are in their appropriate positions for either position of the track switch, suitable contacts are closed indicating that it is appropriate to establish a route over the track switch for the corresponding position. However, there are many instances where the positions of the points can be detected for governing signaling for traffic without such an elaborate mechanism. In some instances, the track switch needs to be accurately detected for controlling the signaling circuits for only the main line position of the track switch; and not in its opposite position for the turnout, since there are no signaling circuits to be controlled. This would then require only a detector for a single point of the track switch, i.e. the main line point. In other instances, it may be desirable to have a detector for each point because there are signaling circuits for both the main track train movement and for the turnout track train movement.

Certain prior art structures are mounted on the ties removed from the rails and connected to the switch points by relatively long rods. Such connections may well become loose over a period of time and cause inaccurate detection.

The present switch point detector is firmly fastened directly to the stock or main rail outside the trackway with a detecting rod extending beneath the main rail to the inside of the trackway where it is connected to the movable switch point by a special connection. This connection is constructed to permit longitudinal and vertical movement of the movable switch point without affecting contact operation; but is constructed to detect any horizontal movement and operate the contact accordingly. This means that the equipment can be adjusted to operate the contacts if the movable switch point moves out of a predetermined position more than a given amount. Railroad rules require the contacts to operate if the movable switch point moves out of its closed position in excess of one-fourth inch.

One of the objects of the present invention is to provide a point detector attachable on the outside of a main rail and having a detector rod pass under the main rail to connect with a movable switch point and be operated thereby.

Another object of the invention is to provide a connection between the detector rod of the point detector and the movable switch point which permits longitudinal and vertical movement of the switch point without operating the detector contacts but causing actuation of the contact in response to a predetermined amount of horizontal movement.

Another object of the invention is to provide a point detector which is responsive to operate its contacts when there is true horizontal movement (i.e. transverse movement) of the movable switch points away from its closed position but to be unresponsive to other movements of such switch points.

SUMMARY OF THE INVENTION

In brief, the switch point detector of the present invention has a detector rod operable only in a longitudinal direction, with means for connecting such detector rod to a movable switch point at right angles thereto so that the horizontal movement of the switch point imparts motion to the detector rod but so that longitudinal or vertcal motion to the switch point does not impart motion to the detector rod.

In addition, the switch point is in effect hinged or pivoted at its heel and when such switch point moves in a horizontal direction it is in effect a swinging action which fails to apply twisting forces to the detector rod due to the construction of the connecting means.

The location of a switch point on the inside of a stock rail operable between open and closed positions has associated therewith a contact box mounted on the outside of the stock rail; and contacts are located within the box operable between two positions so as to be operated by the movement of a detector rod passing from the lower portion of the box beneath the stock rail, which movement is imparted thereto by the switching point being operatively connected thereto with such movement of the detector rod acting to operate the contacts by cam means on the detector rod so that they assume one position when the switch point is closed and assume another position when the switch point is open.

The contact operating means is constructed of plastic material in the form of rods to actuate the contacts against their spring bias.

Also, the means attaching said detector rod to said switch point is constructed to allow longitudinal movement between the stock rail and the switch point without operating the detector rod.

The attaching means allows not only longitudinal movement but also vertical movement between the stock rail and the switch point without operating the detector rod.

For a better understanding of the present invention, together with other and further objects thereto, reference is made to the following description, taken in connection with the accompanying drawings, while its scope will be pointed out in the appended claims.

Figure 7:
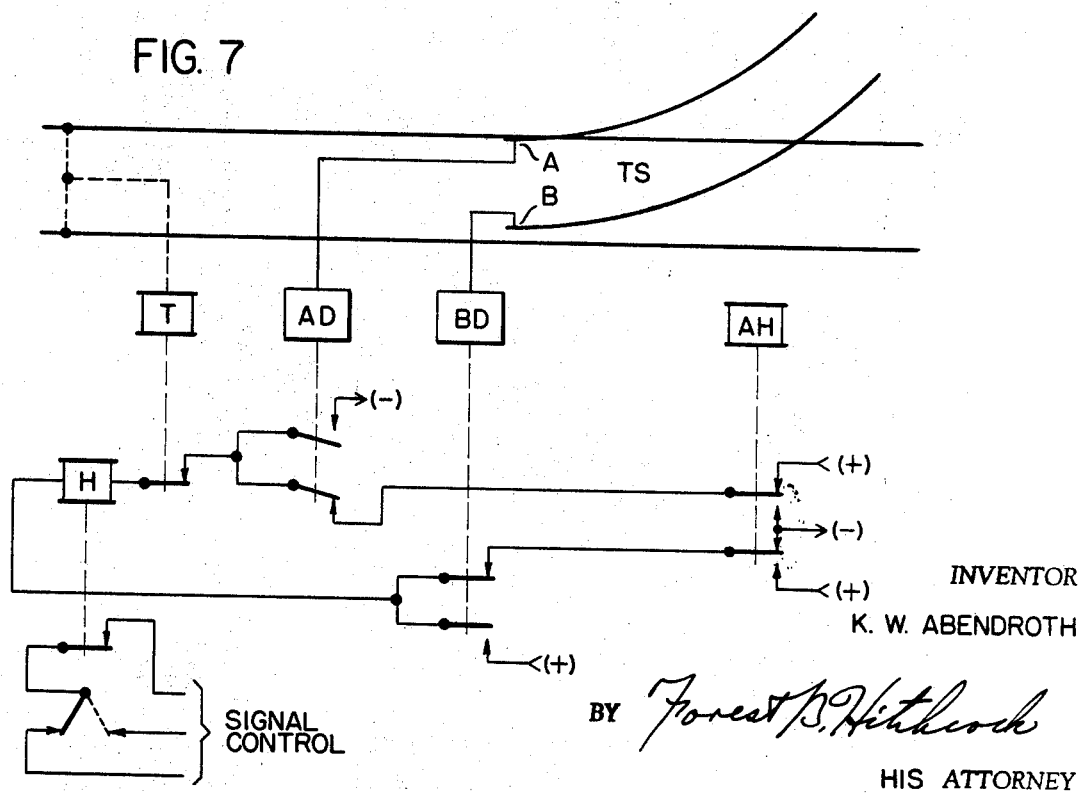
FIG. 7 is a diagrammatic illustration of a trackway with two switch point detectors connected thereto and with such switch point detectors having their contacts included in one possible circuit diagram for a wayside signaling line circuit.

The above drawings are arranged to disclose the operative and structural features of the switch point detector of the present invention without illustrating each and every design characteristic which may be desirable in the structure. Also, the illustration of FIG. 7 is for the purpose of indicating the general function of the structure taken in connection with a typical type of circuit, although it is to be understood that the switch point detector of this invention may be used in any type of circuitry employed for controlling traffic over track switches.

Figure 1:
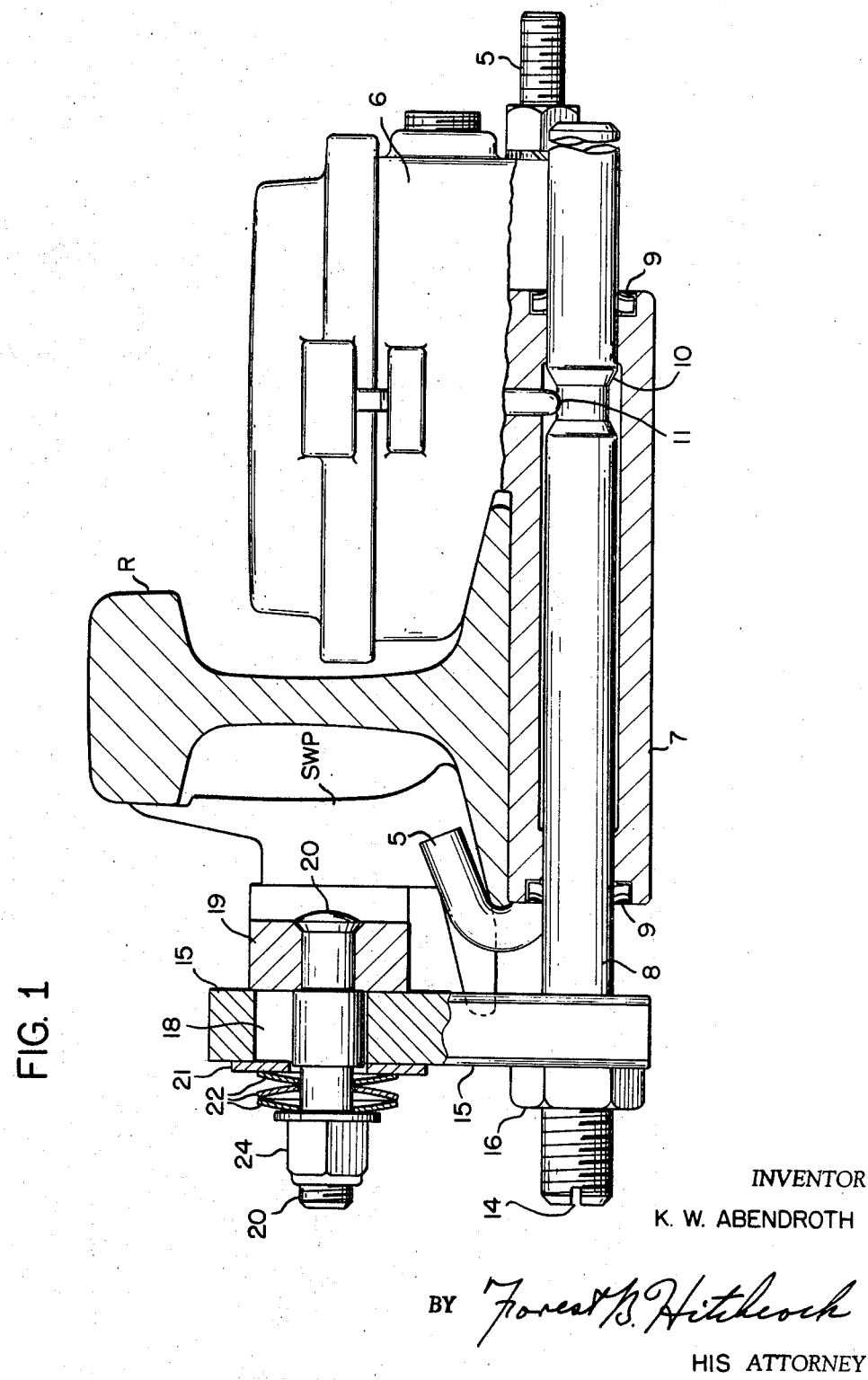
FIG. 1 shows a switch point detector of the present invention attached to a stock or main rail with its operating or detecting plunger extending under the stock rail and connected to a movable switch point.
Figure 2:
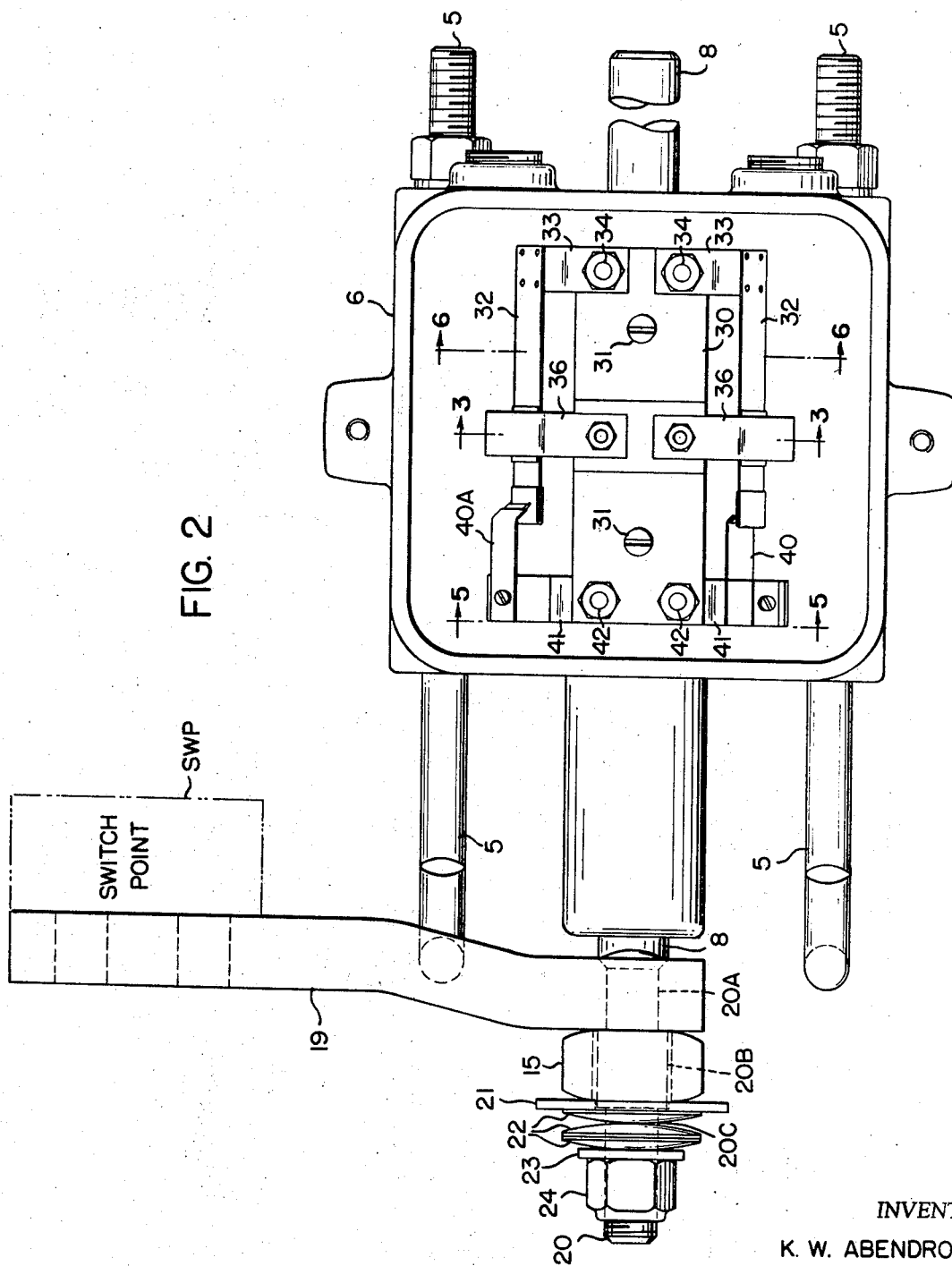
FIG. 2 is a top view of the structure of FIG. 1 with the cover of the contact box removed.
Figure 3:
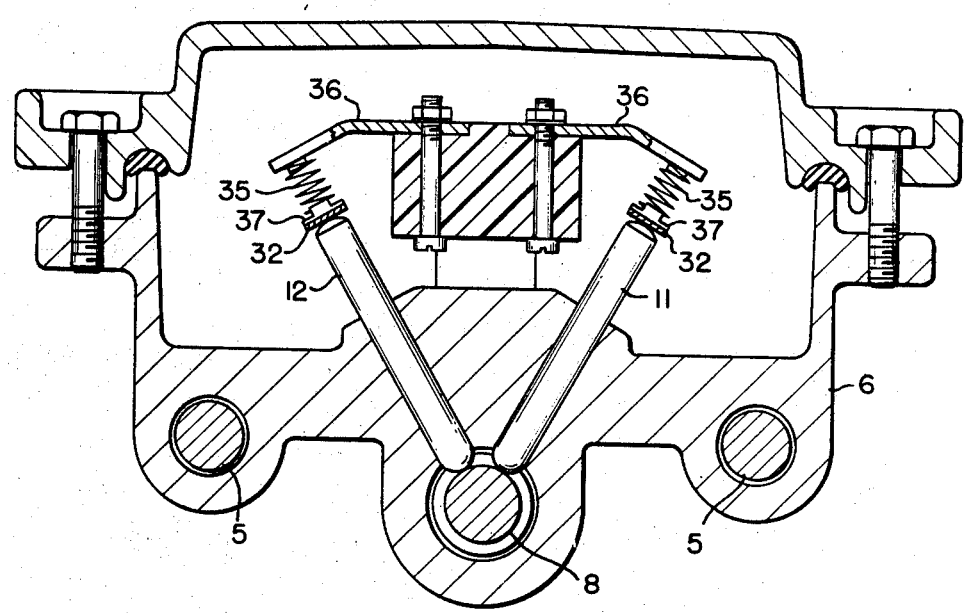
FIG. 3 is a cross sectional view taken on line 3—3 of FIG. 2 of the contact box illustrating how the contacts are operated by the detector plunger or rod.

Also, the switch point detector apparatus of this invention includes the apparatus shown in FIGS. 1 and 2 except for the main or stock rail illustrated in FIG. 1. Such apparatus includes various components such as a contact box, a detector rod or plunger, connecting means between the detector rod and the switch point, and contact operating means such as seen in FIG. 3.

With reference to FIG. 1, a stock rail R is shown having the switch point detector clamped thereto by two hook bolts 5. The hooks of the bolts 5 take hold of the stock rail on one side of the rail and the shape of the contact box 6 receives the other side of the rail. The contact box or casing 6 of the switch point detector has a V-shaped receiving portion formed by the journalling boss 7 extending under the base of the stock rail R as best seen in FIG. 1. The V-shape is continued by the two bosses for the hook bolts on the under side of box 6. When the nuts on the hook bolts are tightened with suitable lock washers, the whole switch point detector assembly is very firmly supported by the stock rail R.

Between the bosses of these two hook bolts 5 is the extended boss 7 on the underside of the contact box 6 which boss 7 extends underneath the stock rail and is hollow for receiving the detector plunger or rod 8. This detector rod 8 is inserted into the hollow portion of the boss 7 through suitable cleaning washer units 9 which units are suitable laminated rubber washers held by metal rings with such units press fitted into a receiving recess at each end of the plunger receiving boss 7.

At a suitable point, this detector plunger or rod 8 has a recess with cam surface 10 for operating a stainless steel or plastic contact operator 11. This contact operator 11 is spring biased as will be later pointed out in connection with a discussion of the contacts of FIG. 3. There are two contact operators 11 and 12 (see FIG. 3), which readily enter the recess when the plunger 8 is moved to a position corresponding to a switch point in a closed position.

The outer end of the plunger 8 is threaded and has a tool receiving slot 14. This end of the plunger 8 is threaded into a vertical connecting link 15 to the desired position to appropriately cause the cam surface 10 to actuate the contact operator 11 when the connected switch point is moved out of its closed position. A locknut 16 is then tightened against the connecting link 15 by placing a suitable tool in the slot 14 using a wrench on nut 16. This positively holds the detector rod 8 in a proper adjustment.

The connecting link 15 has an elongated slot 18 as shown in FIG. 1 for receiving the rivet 20 for holding the connecting bar 19 in place. In FIG. 2, the bar 19 is shown as having a slight offset before being connected to the switch point SWP by bolts, rivets or the like. This bar 19 runs substantially parallel to the switch point SWP and in effect acts as an extension thereof.

The rivet or formed bolt 20 has three distinct portions, i.e., a rivet portion 20A; a round bearing area 20B; and a threaded bolt section 20C (see FIG. 2). The rivet portion 20A is inserted into a hole in bar 19 until the bearing area 20B abuts against such bar. The end of rivet 20 is then peened as shown. The round bearing area 20B is received into the slot 18 of the link 15 with its left end protruding slightly for receiving the cover washer 21. This washer 21 has a hole for appropriately fitting over 20B. Three spring washers 22 are then placed over the threaded bolt section followed by the flat washer 23. The nut 24 is then threaded into position to an appropriate degree of tightness and held in such position by a suitable cotter key (not shown); or some suitable self-locking nut can be used.

The washer 21 is of a suitable size to completely enclose the slot 18 so that it does not receive any stone or dirt deposits of any consequence. The width of bar 19 also covers the slot. This cover effect is present regardless of whether the bar 19 is raised or lowered with regard to the bearing portion 20B in the slot 18. In the event the bar 19 must be limited in height and the slot 18 has to be greater than can be covered by the bar 19, an extra washer like 21 can be placed over bearing portion 20B between the link 15 and bar 19. The two washers 21 would of course have to be correspondingly larger than as shown in FIGS. 1 and 2.

The switch point connecting bar 19, has a slight offset as shown in FIG. 1. This offset makes it so that the connection with the vertical link 15 is spaced away from the head of the rail R a suitable distance so as to allow free passage of all wheels with their downwardly projecting flanges. Such distance is in accordance with the standard distances established by the railroads.

The switch point rail SWP extends longitudinally along the trackway to the associated frog to which it is attached. This point of attachment in effect becomes a pivot from the switch point rail moves in a fairly short arc. However, if the switch point rail SWP is relatively short, the degree of curvature is greater than when the switch point rail is relatively long. In any event, the link 15 has its two sides forming an arc to allow the movement of the switch point and bar 19 without applying any twisting forces on the link 15 and detector rod 8. The trapped forces in spring washer 22 maintain contact between link 15 and bar 19 at any arc position.

From the above description, it will be understood that relative longitudinal movement between the switch point and the main or stock rail R due to temperature changes and the like will result in a limited rotational movement of the link 15 which in turn rotates the detector bar 8. This takes place without any effect on the contact operator 11 because the recess in rod 8 extends completely around the rod 8 as does the cam surface 10. The bearing 20B moves up or down in slot 18 as the case may be. The vertical movement of the switch point also causes the bearing 20B to move up or down in slot 18 as the case may be. If the rivet 20 is in line with rod 8, no movement of link 15 will occur; but if the vertical alignment is disturbed by longitudinal variations of the switch point, the link 15 will allow bearing 20B to move up or down in slot 18 and assume the appropriate rotated position. In summary, only true horizontal (or transverse) movement of the switch point is transferred to the detector rod 8.

Figure 6:
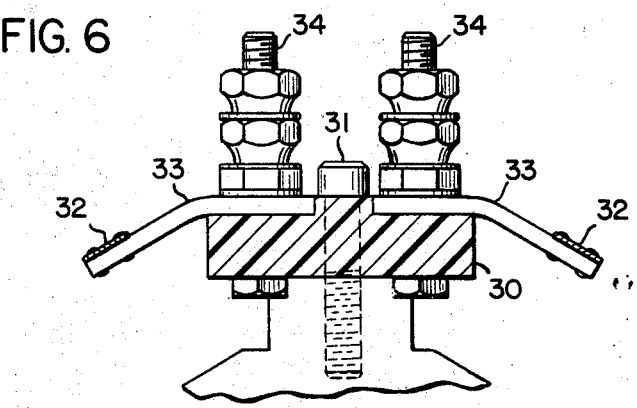
FIG. 6 is a cross sectional view of the contact terminal block taken on line 6—6 of FIG. 2.

With reference to FIG. 2, a terminal block of insulation 30 is attached to raised bosses on the base of box 6 by screws 31. The movable contact fingers 32 are riveted to side arms 33 which are attached to the terminal block by terminals 34. This structure can also be seen in FIG. 6 which is a sectional view taken on line 6—6 of FIG. 2.

Figure 4:
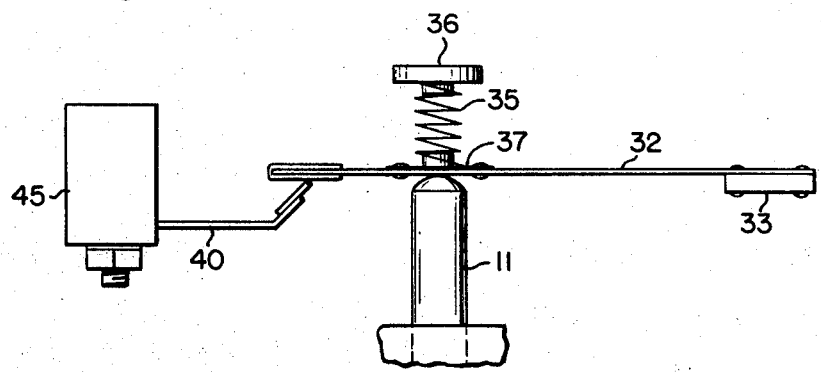
FIG. 4 is a detailed view of one of the contacts.

Referring to FIG. 4 a side view of contact 32 can be seen. This contact 32 is biased by spring 35 held in partially compressed condition between auxiliary arm 36 and the spring mounting pad 37 riveted to contact finger 32. This structure can be seen for both contact fingers 32 in FIG. 3. The spring force of springs 35 causes contact 32 to contact their back points (if any) and also cause contact operators 11 and 12 to be seated on the bottom of the recess surrounding detector rod 8 (see FIG. 1).

The fixed contacts 40 are mounted on auxiliary arms 41 which are in turn attached to terminal block 30 by terminals 42. This can be best seen in FIG. 5 which is a sectional view taken on line 5—5 of FIG. 2.

Figure 5:
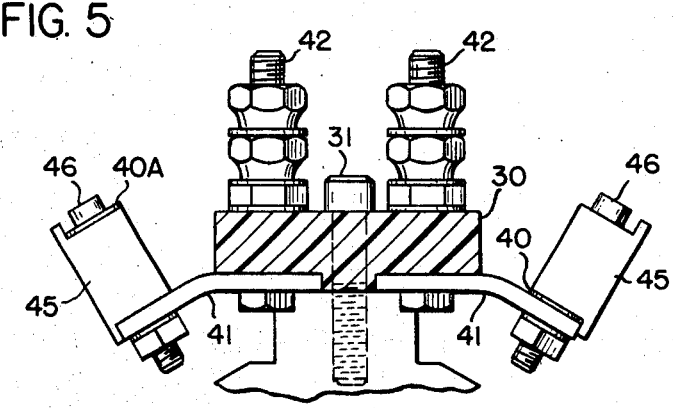
FIG. 5 is a cross sectional view of the contact terminal block taken on line 5—5 of FIG. 2.

In FIG. 5, contact 40 is shown as held between auxiliary arm 41 and block 45 by the tightening of bolt 46. This contact 40 might be called a back contact and the movable contact 32 of FIG. 4 makes contact with it and is forced by spring 35 to cause operator 11 to be seated. Also, in FIG. 5, contact 40A is shown in what might be termed a front contact position on top of block 45 instead of beneath it. In other words, the contacts 40 can be placed in front or back contact position as desired.

It is also apparent that when the switch point is moved out of its closed position, operators 11 and 12 are moved by cam surface upwardly as rod 8 moves to the left. The operators 11 and 12 thus positively actuate contacts 32 against their bias by springs 35. In summary, the contact operator 11 must force its contact 32 upward against spring 35 to open back contact 40; and similarly, the contact operation 12 must force its contact 32 upward against its spring 35 to close front contact 40A. This provides fail-safe operation for the closed position of the switch point SWP, since the breakage of spring 35 would result in the opening of back contact 40.

FIG. 7 shows two detectors AD and BD respectively connected to the two switch points of the track switch TS. Their respective contacts are diagrammatically illustrated as included in a line circuit for a signal control relay H of the neutral polar type. The line circuit also includes a front contact of track relay T. The polarity applied to the line circuit is selected by the relay AH for the signal next in advance. If the switch points are in normal positions, then the signal can be cleared to caution or clear in accordance with traffic conditions in advance; but if the switch points are in reverse positions, the signal can only be cleared to caution for a turn out movement. If, however, there are signalling circuits for the turn out, then they would be connected to the front contact of point detector AD and the back contact of point detector BD in place of the battery symbols shown. For the circuits shown, the switch point A is in a closed normal position, and the switch point B is in an open position. If the switch points are reversed, the point A would be open, and the point B would be closed. In the event both switch points are open, there is of course no complete circuit closed through the contacts of AD and AB.

In the event only a single detector is used for a main line train movement, the detector BD would be removed from the circuit of FIG. 7; and the (—) would be removed from the front point of detector AD. Thus, there would be a circuit for relay H only if the switch point A is closed.

Although the above description relates to what is at present considered to be the preferred embodiment of the invention, it will be obvious to those skilled in the art that various changes and modifications may be made therein, without departing from the invention, and it is intended to cover all such changes and modifications in the appended claims as will fall within the true spirit and scope of the invention.

What I claim is:

1. A switch point detector of a switch layout having a stock rail and a switch point with a rectangular lug secured thereto and extending longitudinally beyond the switch point, the switch point detector having a longitudinal operating detector rod extending under the track rail for actuating a circuit controller mounted within a housing clamped to the outside of the stock rail wherein the improvement comprises;
   a link connecting the lug to the detector rod;
   said link having a flat surface and a slot at one end adapted to be secured against the flat surface of the switch point lug, the link having its other end threaded onto the detector rod; and
   a spring loaded means for clamping the flat surface of the link to the rectangular lug.

2. The switch point detector of claim 1 wherein a pin extends through openings in the lug and in the link for operably connecting the switch point to the detector rod, the openings being of substantially larger size than the diameter of the pin to permit movement of the lug relative to the link both along the axis of the lug and along the axis of the link, and the pin having a spring and nut for maintaining flat surfaces of the lug and link adjoining each other under the bias of said spring.

3. The switch point detector of claim 1 wherein a portion of the housing is in the form of a journal for the detector rod having axially spaced bearings for the rod at opposite sides of the track rail.

References Cited

UNITED STATES PATENTS

| 1,025,585 | 5/1912 | Nelson | 246—253 |
| 2,740,041 | 3/1956 | Marcum | 246—253 |
| 3,188,416 | 6/1965 | Schultz | 200—153.12 X |

FOREIGN PATENTS

| 972,775 | 9/1950 | France. |

ARTHUR L. LA POINT, Primary Examiner

G. H. LIBMAN, Assistant Examiner